Aug. 25, 1925.
A. L. BETTS
1,551,084
BOLSTER
Filed Oct. 2, 1923
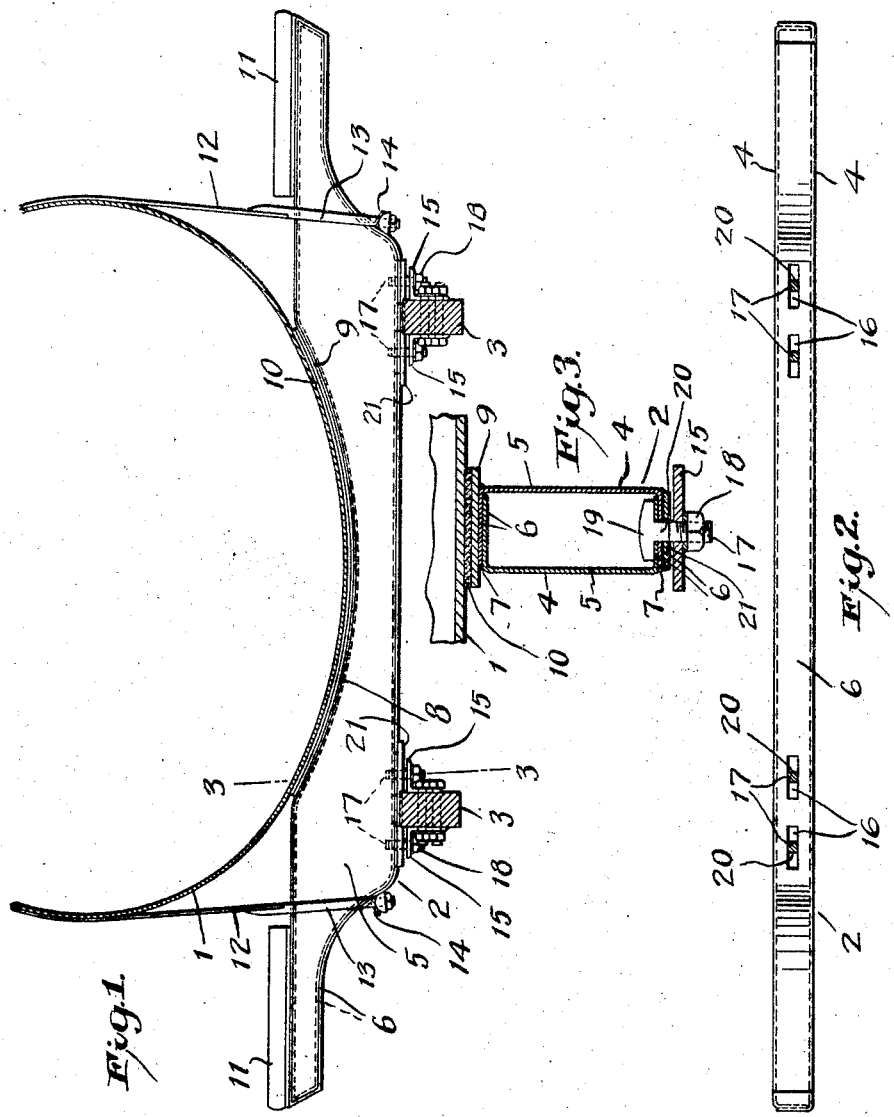
INVENTOR
Arthur L. Betts
BY
ATTORNEY Patented Aug. 25, 1925.

1,551,084

UNITED STATES PATENT OFFICE.

ARTHUR L. BETTS, OF CINCINNATI, OHIO, ASSIGNOR TO AUGUSTINE DAVIS, JR., OF COVINGTON, KENTUCKY.

BOLSTER.

Application filed October 2, 1923. Serial No. 666,111.

*To all whom it may concern:*

Be it known that I, ARTHUR L. BETTS, a citizen of the United States, and resident of Cincinnati, in the county of Hamilton and State of Ohio, have invented a new and useful Bolster, of which the following is a specification.

The invention is an especially strong, comparatively light, and not expensive metal bolster for the mountings or frames of tank trucks, or the like. The safe support of oil or gasoline vehicle tanks on sheet metal cradle members, instead of on wooden bolsters, is highly desirable, and the object of this invention is to provide a construction adapted to resist all stresses occasioned by heavy liquid loads on moving road vehicles. Other features will become apparent.

In the accompanying drawings forming part hereof:

Fig. 1 is a cross-sectional view through the tank, with the improved bolster in elevation;

Fig. 2 is a bottom plan view of the bolster; and

Fig. 3 is a detail sectional view on a larger scale taken on the line 3—3 of Fig. 1.

The truck tank 1 is cradled in bolsters 2, supported on wood side sills 3.

Each of these bolsters is composed of two pressed-steel shells 4, one slightly smaller than the other, formed each with a vertical side wall 5 and horizontally inwardly projecting flanges 6 following the contour of the upper and lower edges. The two sections are assembled with their open sides facing each other and are telescoped to form a box having a double top and bottom between spaced supporting webs formed by the side walls. The sections are then integrally united by oxyacetylene or electric welding 7, at the corners, either all the way along or at intervals.

The top of the bolster is formed with a cradle 8, in which is welded a bearing plate 9 forming a broad seat for the tank. A layer of anti-squeak material 10 is shown between this plate and the tank. To produce the cradle on the bolster it is necessary to form the middle sections of the top flanges of the two shells, between the end portions of the bolster, on a concave curvature, bending them on this curvature from the side walls 4, 5, the upper edges of which are correspondingly incurved.

The ends of the bolster are designed to carry running-boards 11, and the tank is held down in the cradle by hands 12, the terminals 13 of which are caught by nuts and cross-pieces beneath lugs 14 on the under sides of the bolsters.

Angle irons 15 bolted to opposite sides of the sills afford flanges to which the bolsters are fastened. For this purpose the bottom flanges of the bolster are longitudinally slotted in registry, as shown at 16 in Fig. 2, to cooperate with bolts 17, the threaded ends of which pass downward through holes in the flanges 15 and are engaged by nuts 18. These bolts have T-heads 19, the width of which permits them to be inserted up through the slots, the bolts being then turned so that the heads lie crosswise of the slots. Square sections of the bolts immediately below the heads keep the bolts from turning when in place. In assembling, the bolts must be pushed upward sufficiently to carry the square sections above and clear of the slots, whereupon the bolts are turned 90° and then drawn downward to a seat. The length of the slots is such as to enable the distance between the sills of the mounting to be varied for any make of truck.

The slots are formed in both layers of the bottom of the bolster and in reinforcing irons 21 which are welded to the bottom of the bolster and lie next to the sills.

What is claimed as new is:

1. A vehicle bolster formed of two sheet metal shells, each shell comprising a side wall with inwardly bent flanges extending along the upper and lower edges of the wall following the contour of the bolster, the two shells being united together with their reversely and inwardly projecting flanges telescoped to form a top and bottom of double thickness between spaced supporting webs formed by the side walls.

2. A vehicle bolster formed of two sheet metal shells, each shell comprising a side wall with inwardly bent flanges extending along the upper and lower edges of the wall following the contour of the bolster, the two shells being united together with their reversely and inwardly projecting flanges telescoped to form a top and bottom of double thickness between spaced supporting webs formed by the side walls, the two shells forming the bolster being united by welds at the telescoping flanges.

3. A vehicle bolster formed of two sheet metal shells, each shell comprising a side wall with inwardly bent flanges extending along the upper and lower edges of the wall following the contour of the bolster, the two shells being united together with their reversely and inwardly projecting flanges telescoped to form a top and bottom of double thickness between spaced supporting webs formed by the side walls, the middle sections of the top flanges of the shells lengthwise of the bolster being formed from the webs on a concave curvature to produce a tank seat.

4. A vehicle bolster formed of two sheet metal shells, each shell comprising a side wall with inwardly bent flanges extending along the upper and lower edges of the wall following the contour of the bolster, the two shells being united together with their reversely and inwardly projecting flanges telescoped to form a top and bottom of double thickness between spaced supporting webs formed by the side walls, the middle sections of the top flanges of the shells lengthwise of the bolster being formed from the webs on a concave curvature to produce a tank seat, and a curved seat plate lying in said cradle and united thereto.

5. A vehicle bolster formed of two sheet metal shells, each shell comprising a side wall with inwardly bent flanges extending along the upper and lower edges of the wall following the contour of the bolster, the two shells being united together with their reversely and inwardly projecting flanges telescoped to form a top and bottom of double thickness between spaced supporting webs formed by the side walls, the bottom flanges of the bolster containing longitudinal slots in register for the reception of bolts for fastening the bolster to sills.

6. A hollow bolster having longitudinal slots in the bottom, in combination with fastening bolts having T-heads sufficiently narrow to be insertible up through the slots, and square sections beneath the heads whereby the bolts are held against turning after the heads have been introduced, turned crosswise and then drawn down.

ARTHUR L. BETTS.